Patented Aug. 12, 1952

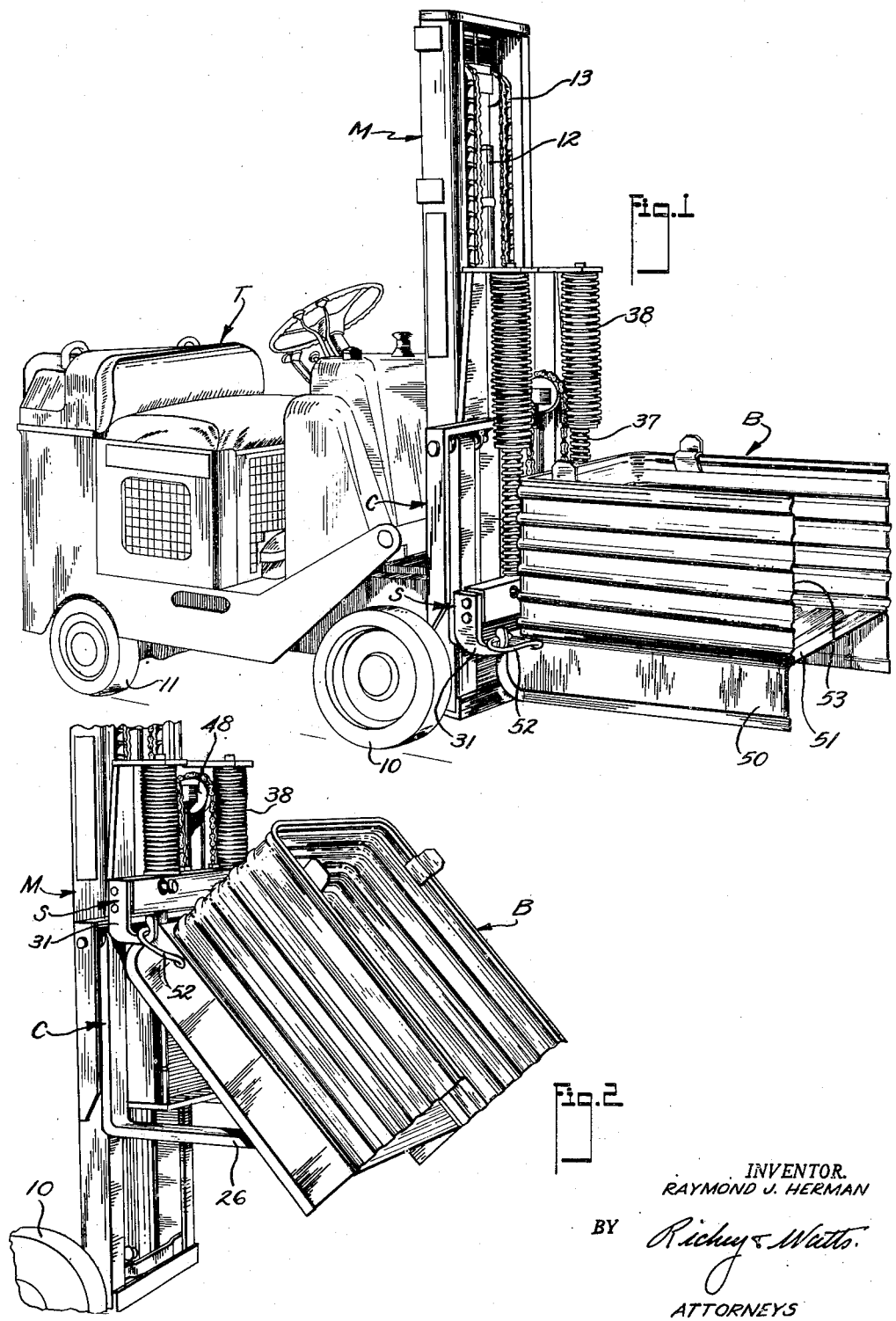

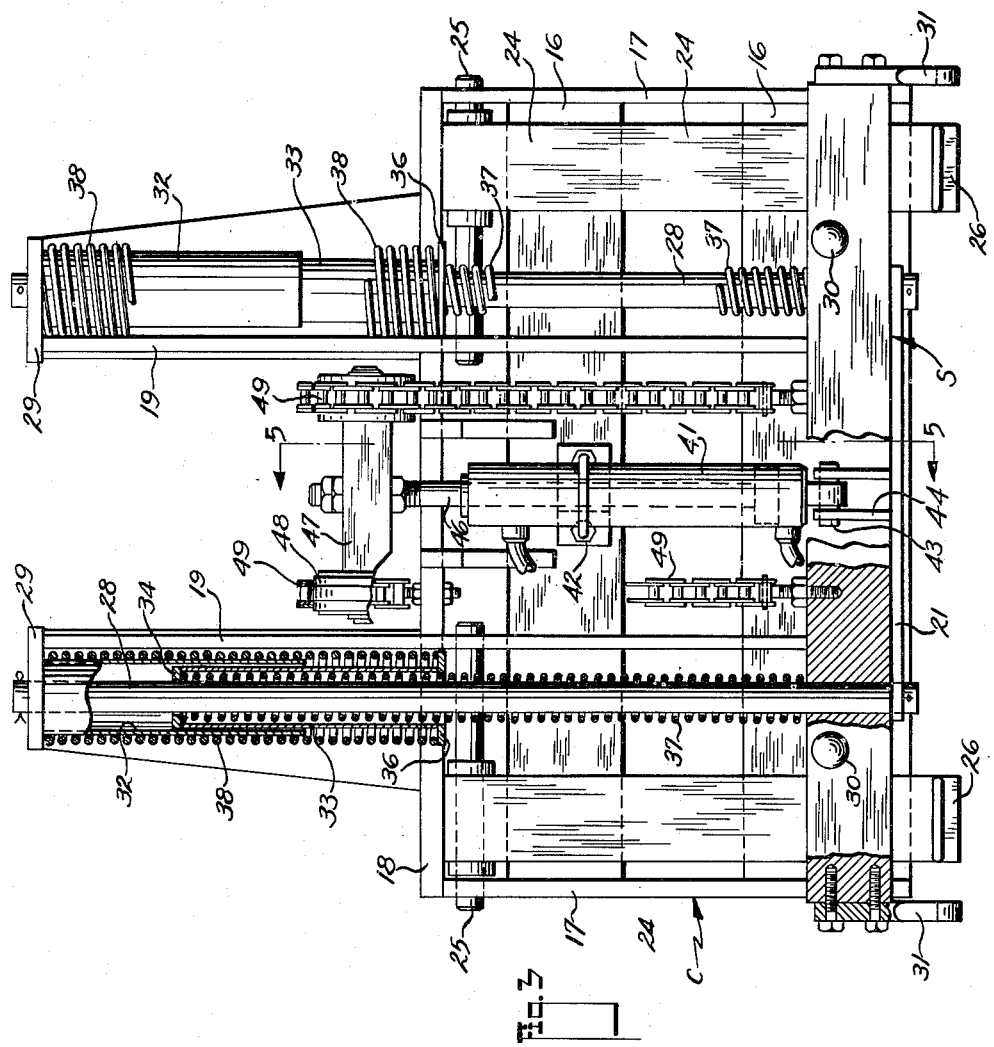

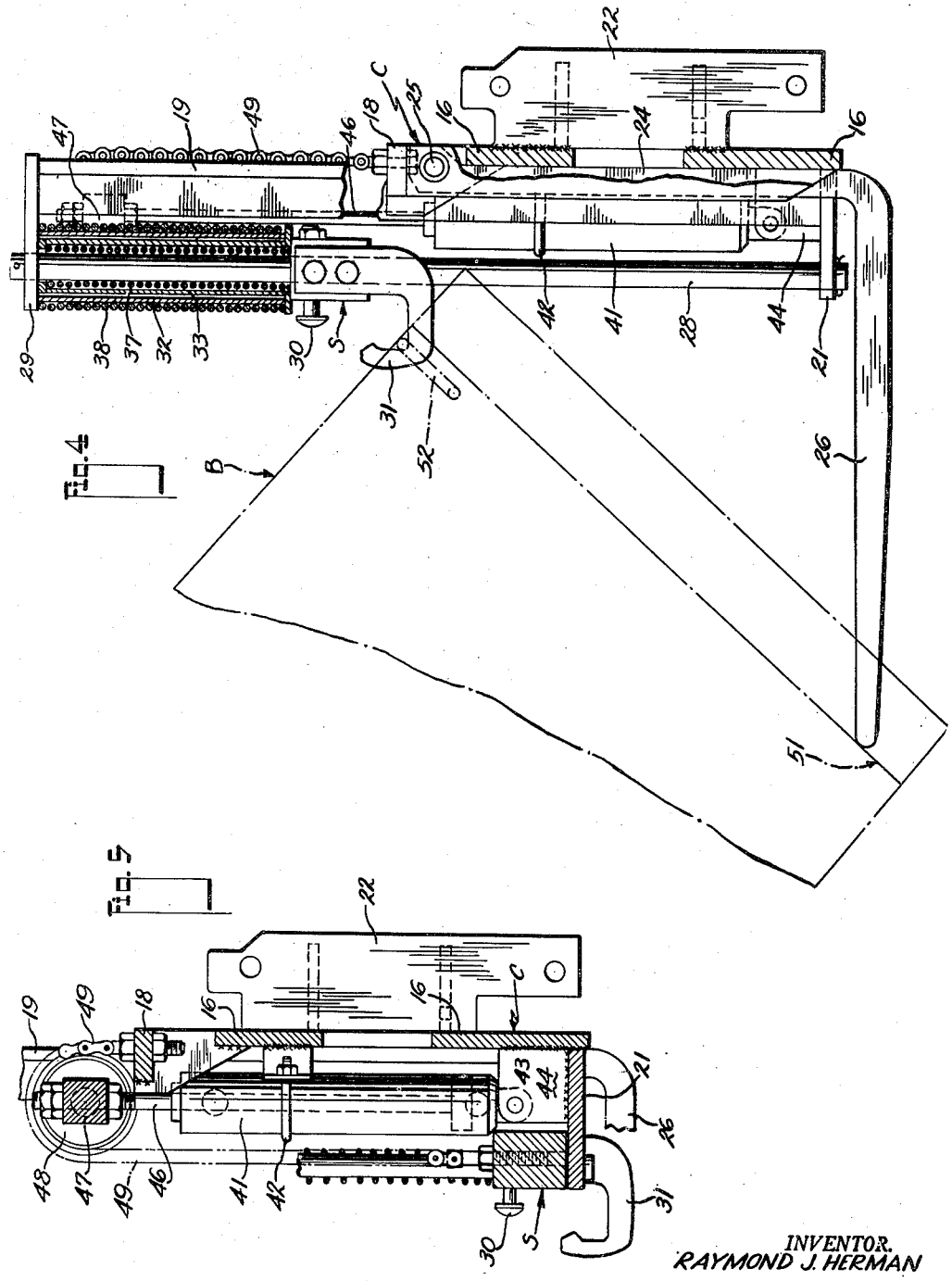

2,606,680

UNITED STATES PATENT OFFICE 2,606,680

SKIP DUMPING ATTACHMENT

Raymond J. Herman, Cleveland, Ohio, assignor to Towmotor Corporation, Cleveland, Ohio, a corporation of Ohio Application May 17, 1949, Serial No. 93,695

10 Claims. (Cl. 214—121)

This invention relates generally to material-handling apparatus, and, more specifically, to apparatus for the lifting, conveying, and dumping of loose material by means of a skip bucket.

One of the problems encountered in the material-handling art is that of transporting loose or bulk material from one location to another, including the problem of unloading such material from its containers and the difficulties extant in handling materials in batch lots. For example, it may be desired to transport a large number of screw machine products from one machine to another, and finally to deliver the finished products to a location some distance from the point of the last operation. The handling of loose or bulk articles in this and similar situations is readily effected by the use of apparatus made in accordance with the present invention.

One feature of the present invention resides in the construction of the operating mechanism for a container or skip bucket and the orientation thereof with the carriage-elevating hoist of a conventional lift truck. Briefly, the invention contemplates a lift truck having a carriage and elevating slide thereon and a second slide on the carriage for elevating the load carried thereby. The second slide is provided with hooks positioned for engagement with eyes in the lower rearward end of the skip bucket. A hydraulic motor assembly is employed to raise the secondary slide relative to the carriage which, in the preferred form of the invention, includes piston, cylinder, and chain assembly similar to that commonly employed to elevate the carriage of the lift truck. The usual forwardly disposed work-supporting platform or fork carried by the carriage is modified in the present design to form the fulcrum for the container during the operation of the secondary hoist. The skip bucket is formed with side rails below the side walls thereof to accommodate the entry of the fork and the eyes are positioned on the bucket side rails or pallet risers for engagement with the hooks on the second slide coincident the initial movement of the carriage.

In operation, the vehicle is maneuvered in the usual manner to effect the engagement of the forks with the palletized container. While in this position the hooks on the secondary slide will underlie the eyes on the skip bucket and will be interengaged therewith upon elevation of the carriage and load-carrying platform. When it is desired to dump the load into a container, the carriage is elevated to the requisite height and positioned with the open end of the skip bucket in vertical alignment therewith. The secondary lift, or bucket hoist, is then independently elevated to lift the rearward portion of the skip bucket and causes a forward portion thereof to pivot about the end of the fork. When the angle of the skip bucket exceeds the angle of repose of the material therein, the work parts or waste in the skip bucket will slide therefrom and fall, under the force of gravity, into the container. After the skip bucket is emptied and the carriage slide is lowered, the lift truck may be manipulated to deposit the palletized bucket in any suitable location.

Another feature of the invention resides in the construction of the mechanism that effects the retraction of the carriage slide from its elevated position. In the preferred form the slide is urged to its lowermost position by an organization of springs arranged to increase the effort imposed upon the secondary slide simultaneous the discharge of the material carried in the bucket. In detail, the springs are arranged so that the effort imposed upon the hoist is relatively light until the material in the bucket is discharged therefrom, thereafter a second spring is engaged by the slide and compressively loaded during the continued movement of the hoist. The springs are designed to assure the retraction of the slide, but, as noted above, the effort of the second spring is not imposed upon the hoist until the weight of the material in the bucket is relieved therefrom.

It will be understood from the following detailed description of the invention that other objects and advantages include the provision of a simple, rugged assembly that may be readily mounted upon a lift truck carriage with virtually no alteration; that such assembly may be readily serviced and maintained, and that the improved apparatus will facilitate rapid and precise control of the bucket by the operator.

The manner in which these and other features and advantages of the invention are accomplished will be explained in connection with the following detailed description of a preferred embodiment thereof.

In the drawings:

Fig. 1 is a perspective view of a lift truck embodying the invention;

Fig. 2 is a view in perspective of a fragmentary portion of the bucket and carriage in their elevated position;

Fig. 3 is a front elevation of the carriage assembly made in accordance with the invention;

Fig. 4 is a side elevational view, shown partially in section, of the carriage; and Fig. 5 is a vertical sectional view taken on a plane indicated by the line 5—5 in Fig. 3.

Referring first to Fig. 1, the apparatus of the invention is incorporated in a lift truck T of a type well-known in the material-handling art. These trucks include front driving wheels 10, rear steering wheels 11, a generally vertical mast assembly M, and an elevating carriage C. It is understood that details of the truck and mast construction form no part of the present invention, and any vehicle embodying a carriage-elevating mechanism may be built or modified to incorporate the invention. In the vehicle shown in Fig. 1 the carriage C is elevated by the usual hydraulic cylinder and piston assembly 12 provided with suitable chains 13 passing over a crosshead on the piston of the hydraulic lift assembly. Typical constructions suitable for the purpose are shown in the patent to Guerin et al., No. 2,411,263, issued November 19, 1946.

Details of the novel carriage assembly which may be mounted on the lift truck to produce the new and improved mode of operation are best shown in Figs. 3 to 5. The carriage assembly C includes a generally rectangular frame comprising crossbars 16 welded to vertical side rails 17, a top bar 18, and a pair of vertical stanchions 19. A bottom plate 21 is welded to the lower crossbar 16 (Fig. 4) to provide a support for an independently movable slide S mounted on the carriage. Brackets 22 fabricated for the support of the guide rollers usually mounted in the channels of the mast M are welded to the crossbars 16. The details of the carriage mounting do not form part of the present invention, and suitable designs well known in the art may be employed to facilitate the support and vertical translation of the carriage in the mast. The carriage also includes fork members 24 mounted on pins 25 supported between the uprights 17 and 19. The load supported by the forks is carried upon the forwardly disposed tines 26.

The slide S is mounted on the carriage for elevating the rearward portion of a skip bucket B. This structure includes a pair of bumpers 30 to delimit the rearward movement of the bucket and a pair of hooks 31 for the retention of the skip bucket B when moved to its elevated position. The slide S comprises a rigid cross member mounted for vertical reciprocation and guided by a pair of rods 28 each supported at their extremities by the lower plate 21 and at their upper ends by brackets 29 carried by the stanchions 19.

Spring assemblies are provided on each of the rods 28 to effect the return of the slide to its lowermost position. Each spring assembly includes an outer sleeve 32 attached to the bracket 29 and an inner sleeve 33. The inner sleeve is provided with a flange 34 in the upper end thereof, which is apertured to receive the rod 28, and the lower end thereof is formed with a base flange 36 constituting a seat for the spring 38. The primary return spring 37 is telescopically engaged by the bar 28, and is retained at its lower end on the cross member of the slide S. The upper end of the spring is seated upon the flange 34 of the inner sleeve. The secondary or auxiliary spring 38 is retained by the bracket 29, the lower end thereof being seated upon the flange 36. The combined effect of the two springs urges the slide S into its lowermost position and against the bottom plate 21.

The hydraulic motor that operates the carriage-elevating mechanism is also coupled to a piston cylinder assembly for actuating the slide S. The details of the latter piston and cylinder construction and the controls therefor are not shown since these elements are well known in the hydraulic art, and form per se no part of the present invention. The cylinder and piston assembly 41 are restrained against undue lateral movement by a bracket 42 mounted upon the upper crossbar 16 and the lower end of the cylinder is fulcrumed upon a pin 43 anchored in a pair of supporting ears 44 secured to the plate 21. The piston rod 46 is affixed upon a crosshead 47 which carries a pair of shives 48 for supporting a pair of flexible chains 49 coupled at one end to the carriage frame plate 18 and at the other end to the cross member of the slide S. It will be recognized that the admission of fluid under pressure beneath the piston in the operating cylinder 41 will cause the elevation of the crosshead 47 and the consequent elevation of the slide at twice the speed thereof, since one end of each chain 49 is fixed to the carriage and the other end thereof is attached to the slide.

The apparatus is adapted to transport materials contained in an open-mounted skip bucket B which includes depending side rails 50 constituting pallet risers for supporting the bottom 51 of the bucket in spaced relation with the floor. Loops or eyes 52 are welded upon each side of the skip bucket for engagement by the hooks 31 on the slide S.

In operation, assuming the bucket B contains a quantity of machine parts or other divided material, the lift truck T is manipulated to position the forks beneath the bucket with the stops or bumpers 30 in the cross member of the slide S. The controls for the lift truck are then manipulated to elevate the carriage and effect the engagement of the hooks 31 with the eyes 52, as shown in Fig. 1.

When it is desired to discharge the material from the bucket the hydraulic controls for the slide mechanism are manipulated so that fluid under pressure will enter the cylinder beneath the piston and effect the elevation of the crosshead 47. This will cause the elevation of the slide and such movement may be maintained until the angle of the bucket exceeds the angle of repose of the material in the bucket B, whereupon the material will slide from the bucket into another container or stock pile. If the container or stock pile for the material is above the ground, the carriage assembly C, as shown in Fig. 2, may be elevated to position the mouth of the bucket well above the depository.

During the elevation of the slide the primary springs are compressed until the slide S strikes the lower face of flange 36 on the inner sleeve 33, whereupon the secondary springs 38 are compressed directly by the slide. Both springs now tend to return the slide to its lowermost position until the slide is freed from engagement with flange 36 whereupon the total force of the springs is reduced.

When the bucket is empty and the rearward end thereof is elevated, the effect of gravity is too small to assure the retraction of the slide without the augmented effort of the secondary springs 38. When the rearward end of the bucket is lowered, however, the effect of gravity thereon is increased and the frictional resistance offered by the forks 26 is diminished, hence the effort of the primary springs 37 is adequate to complete the return movement of the slide and force the hydraulic fluid from the cylinder 41. Thus the parts are under a relatively light load during the greater portion of the lift stroke of the bucket slide, and the auxiliary springs 38 serve only to initiate the return of the bucket and slide and effect the discharge of the fluid in the cylinder 41. This structure provides a positive control without the necessity of a reversible hydraulic circuit. In other words, the hydraulic control mechanism may be restricted to valving to admit fluid under pressure beneath the piston and an opening to the reservoir for the discharge of the fluid from the cylinder during the stroke of the piston.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A vehicle for conveying and dumping a skip bucket comprising a chassis, a generally vertical mast mounted forwardly on said chassis, a carriage slidably mounted on said mast, load-supporting means extending forwardly from a lower portion of said carriage, means to move said carriage along the mast, a slide mounted for vertical reciprocation along said carriage, motor means to raise said slide along the carriage, catch means on said slide for connection with complementary means on the rearward portion of a skip bucket, whereby said load-supporting means may be positioned under a skip bucket with the slide lowered, said slide motor means operated to engage said hook means with the complementary means on the bucket, the carriage elevated to raise the entire bucket, and the slide further elevated independently of the carriage to raise the rearward portion of the bucket while a forward portion pivots about the forward end of said load-supporting means, in order to dump the bucket.

2. A vehicle for conveying and dumping a skip bucket comprising a chassis, a generally vertical mast mounted forwardly on said chassis, a carriage slidably mounted on said mast, load supporting means extending forwardly from a lower portion of said carriage, means to move said carriage along the mast, a slide mounted for vertical reciprocation along said carriage, hydraulic piston and cylinder means connected to raise said slide along the carriage, hook means on said slide for connection with complementary means on the rearward portion of a skip bucket, whereby said load-supporting means may be positioned under a skip bucket with the slide lowered, said slide motor means operated to engage said hook means with the complementary means on the bucket, the carriage elevated to raise the entire bucket, and the slide further elevated independently of the carriage to raise the rearward portion of the bucket while a forward portion pivots about the forward end of said load-supporting means, in order to dump the bucket.

3. Apparatus for conveying and dumping a skip bucket comprising a carriage arranged for reciprocation on the mast of a lift truck, load-supporting means extending forwardly from a lower portion of said carriage, a slide mounted for vertical reciprocation along said carriage, motor means to raise said slide along the carriage, hook means on said slide for connection with complementary means on the rearward portion of a skip bucket, whereby said carriage load-supporting means may be positioned under a skip bucket with the slide lowered, said slide motor means operated to engage said hook means with the complementary means on the bucket, the carriage elevated to raise the entire bucket, and the slide elevated independently of the carriage to raise the rearward portion of the bucket while a forward portion pivots about the forward end of said load-supporting means, in order to dump the bucket.

4. Apparatus for conveying and dumping a skip bucket comprising a carriage arranged for reciprocation on the mast of a lift truck, load-supporting means extending forwardly from a lower portion of said carriage, a slide mounted for vertical reciprocation along said carriage, fluid motor means comprising piston and cylinder elements, one element being connected to the carriage, a guide fastened to the other element, flexible tension means passing over said guide with one portion connected to the carriage and a remote portion connected with said slide in order to raise said slide along the carriage, hook means on said slide for connection with complementary means on the rearward portion of a skip bucket, whereby said carriage load-supporting means may be positioned under a skip bucket with the slide lowered, said fluid motor means operated to engage said hook means with the complementary means on the bucket, the carriage elevated to raise the entire bucket, and the slide elevated independently of the carriage to raise the rearward portion of the bucket while a forward portion pivots about the forward end of said load-supporting means, in order to dump the bucket.

5. Apparatus for conveying and dumping a skip bucket comprising a carriage arranged for reciprocation on the mast of a lift truck, load-supporting means extending forwardly from a lower portion of said carriage, a slide mounted for vertical reciprocation along said carriage, motor means to raise said slide along the carriage, hook means on said slide for connection with complementary means on the rearward portion of a skip bucket, whereby said carriage load-supporting means may be positioned under a skip bucket with the slide lowered, said slide motor means operated to engage said hook means with the complementary means on the bucket, the carriage elevated to raise the entire bucket, and the slide elevated independently of the carriage to raise the rearward portion of the bucket while a forward portion pivots about the forward end of said load-supporting means, in order to dump the bucket, and spring means between said carriage and slide tending to lower said slide.

6. Apparatus for conveying and dumping a skip bucket comprising a carriage arranged for reciprocation on the mast of a lift truck, load-supporting means extending forwardly from a lower portion of said carriage, a slide mounted for vertical reciprocation along said carriage, motor means to raise said slide along the carriage, hook means on said slide for connection with complementary means on the rearward portion of a skip bucket, whereby said carriage load-supporting means may be positioned under a skip bucket with the slide lowered, said slide motor means operated to engage said hook means with the complementary means on the bucket, the carriage elevated to raise the entire bucket, and the slide elevated independently of the carriage to raise the rearward portion of the bucket while a forward portion pivots about the forward end of said load-supporting means, in order to dump the bucket, and spring means between said carriage and slide tending to lower said slide, said spring means including primary and auxiliary spring means, the primary spring means being arranged to resist initial lifting of the slide and the auxiliary spring means being arranged to resist further lifting of the slide after a portion of the lifting stroke is completed.

7. Apparatus for conveying and dumping a skip bucket comprising a carriage arranged for reciprocation on the mast of a lift truck, load-supporting means extending forwardly from a lower portion of said carriage, a slide mounted for vertical reciprocation along said carriage, motor means to raise said slide along the carriage, hook means on said slide for connection with complementary means on the rearward portion of a skip bucket, upper and lower bracket means on said carriage, guide rod means bridging the brackets, said slide sliding over said guide rod means, and spring means between said upper bracket means and said slide.

8. Apparatus for conveying and dumping a skip bucket comprising a carriage arranged for reciprocation on the mast of a lift truck, load-supporting means extending forwardly from a lower portion of said carriage, a slide mounted for vertical reciprocation along said carriage, motor means to raise said slide along the carriage, hook means on said slide for connection with complementary means on the rearward portion of a skip bucket, upper and lower brackets on said carriage and a rod bridging the brackets, sleeve means surrounding said rod, a first spring extending between said apparatus of said sleeve means, a second spring stronger than said first spring extending between said apparatus and said sleeve means and tending to move said sleeve means to compress said first spring, elevation of said slide relative to said carriage compressing and first spring for part of the stroke and said second spring for the remainder of the stroke.

9. Apparatus for conveying and dumping a skip bucket comprising a carriage arranged for reciprocation on the mast of a lift truck, load-supporting means extending forwardly from a lower portion of said carriage, a slide mounted for vertical reciprocation along said carriage, motor means to raise said slide along the carriage, hook means on said slide for connection with complementary means on the rearward portion of a skip bucket, upper and lower brackets on said carriage and a rod bridging the brackets, telescoping sleeves surrounding said rod, a first spring extending between said apparatus and one of said sleeves, a second spring tending to separate said sleeves, elevation of said slide relative to said carriage compressing said first spring for part of the stroke and said second spring for the remainder of the stroke.

10. Apparatus for conveying and dumping a skip bucket comprising a carriage arranged for reciprocation on the mast of a lift truck, load-supporting means extending forwardly from a lower portion of said carriage, a slide mounted for vertical reciprocation along said carriage, motor means to raise said slide along the carriage, hook means on said slide for connection with complementary means on the rearward portion of a skip bucket, upper and lower brackets on said carriage and a rod bridging the brackets, telescoping sleeves surrounding said rod, a first spring extending between said apparatus and one of said sleeves, a second spring stronger than said first spring tending to separate said sleeves, elevation of said slide relative to said carriage compressing said first spring for part of the stroke and said second spring for the remainder of the stroke.

RAYMOND J. HERMAN.

REFERENCES CITED

The following references are of record in the file of this patent:

UNITED STATES PATENTS

| Number | Name | Date |
|---|---|---|
| 1,139,504 | Dornan | May 18, 1915 |
| 1,628,389 | Cochran | May 10, 1927 |
| 1,707,881 | Shepard, Jr., et al. | Apr. 2, 1929 |
| 1,786,884 | Allan | Dec. 30, 1930 |
| 2,241,193 | Garnett et al. | May 6, 1941 |
| 2,335,572 | Schroeder | Nov. 30, 1943 |
| 2,397,271 | Ladwig | Mar. 26, 1946 |
| 2,445,038 | Riemenschneider et al. | July 13, 1948 |
| 2,480,066 | Weaver | Aug. 23, 1949 |
| 2,507,583 | Wellman | May 16, 1950 |
| 2,516,686 | Druschel | July 25, 1950 |
| 2,554,930 | Ulinski | May 29, 1951 |

FOREIGN PATENTS

| Number | Country | Date |
|---|---|---|
| 164,961 | Great Britain | June 23, 1921 |